United States Patent

Korpel

[15] 3,670,098
[45] June 13, 1972

[54] OPTICAL SCANNING APPARATUS

[72] Inventor: Adrianus Korpel, Prospect Hgts., Ill.
[73] Assignee: Zenith Radio Corporation, Chicago, Ill.
[22] Filed: March 9, 1970
[21] Appl. No.: 17,545

[52] U.S. Cl. ............................................. 178/6, 350/5.3
[51] Int. Cl. ............................................................. H04n 1/00
[58] Field of Search .................. 73/67.5 H; 340/5 H; 350/3.5; 178/6

[56] References Cited

OTHER PUBLICATIONS

An Optical Heterodyne Ultrasonic Image Converter, G. A. Masser, Proceedings IEEE Vol. 56, No. 12, Dec. 1968 2157–2161
Rapid Sampling of Acoustical Holograms Laser-Scanning, Korpel et al., JASA Vol. 45, No. 4, 1968

Primary Examiner—Robert L. Griffin
Assistant Examiner—Barry Leibowitz
Attorney—John J. Pederson and Francis W. Crotty

[57] ABSTRACT

An object to be studied or analyzed is flooded with light from a laser. The light field transmitted from the object, which might for example be a transparency or a vibrating surface, is received by a photodetector. Another portion of the laser light or radiation is deflected throughout a scanning pattern and also caused to fall upon the photodetector. An optical system included in the reference beam path brings the reference beam to a focus (either real or virtual image) at a selected distance from the active surface of the photodetector. As a result, the electric signals developed by the photodetector represent a cross-section of the light field, transmitted from the object, located a distance from the photodetector surface which is the same as the distance therefrom to the focus of the scanned reference beam. Different cross-sections of the signal field from the object may be displayed merely by modifying the optical system. Depending on the manner in which the electric signals are processed, they may be caused to represent either a direct image or a hologram of the cross-section being visualized. By using the electric signals to drive a television-type monitor, a real-time display is reproduced.

11 Claims, 3 Drawing Figures

Inventor
Adrianus Korpel
By [signature]
Attorney

OPTICAL SCANNING APPARATUS

The present invention pertains to apparatus for analyzing an object. More particularly, it relates to apparatus utilizing coherent light for permitting reproduction or recording of an image or a hologram of an object under study.

The introduction of the laser has resulted in the development of a number of interesting and useful systems for reproducing images of objects and for investigating or measuring characteristics of objects. The reproduction of an image refers to a method or system which concerns itself with the amplitude of light that is transitted through or reflected from an object; more precisely, imaging concerns itself with power which is proportional to the square of the amplitude. Another technique to which great attention has been devoted as a result of the availability of the laser is that of holography. Holography may be described as a method for reconstructing the amplitude and phase distribution of a propagating field in a given plane. In the field of optics, holography has become identified with three-dimensional reconstruction. Somewhat analogous techniques have evolved in which a sound image is obtained in a way similar to optical image formation and those techniques have been extended to include holographic systems. The principles and techniques of acoustic imaging have been merged with those of optical holography, resulting in a new field known as acoustic holography.

In optical holography, an image field is made to interfere with a so-called reference beam and the resulting interference pattern is recorded on photographic, thermoplastic or photochromic film. This pattern consists of a system of fine fringes varying both in contrast and fringe spacing. The contrast at any particular point is a measure of the amplitude of the image field at that point, whereas the positions of the fringes relate to the phase with the spacing being determined by the slope of the image field wavefront relative to that of the reference beam. Thus, although a recording medium is basically responsive only to light power, it has nevertheless been possible to record both light amplitude and light phase. Reconstruction of the image field is accomplished by illuminating the recorded interference pattern with a reference beam. Strictly speaking, this generates two related fields (conjugate images) which propagate in different directions and may be separated by spatial filters. In the analogous systems which have been used in acoustic holography, a conventional image conversion device is employed and an acoustic reference beam is added to the sound field. A pattern of fringes appears on the image conversion device. The fringe pattern is photographed and the developed negative is illuminated with a laser beam. Depending on the scale of the hologram, different cross-sections of the sound field may be inspected by various known methods.

While electronic camera-type devices such as image orthicons and vidicons have found general use for optical imaging, such devices are insufficiently sensitive for the inspection or analysis of very weak optical fields. They also are not sufficiently discriminatory be able to distinguish optical image information represented by light of a particular frequency that is mixed with other light of slightly different frequencies as is typically the case in acoustic halography.

It is, accordingly, a general object of the present invention to provide apparatus for analyzing or inspecting optical fields which may be extremely weak or require separation from among closely spaced optical frequencies.

It is another object of the present invention to provide apparatus which permits viewing any desired cross-section of an optical field.

A further object of the present invention is to provide apparatus of the foregoing character which is capable of providing either direct imaging or holographic representation.

One specific object of the present invention is to provide apparatus of the foregoing character which enables the reproduction of real-time acoustic holograms.

Apparatus for analyzing an object in accordance with the present invention includes means for flooding a surface area of an object to produce a coherent-light signal field perturbed by a characteristic of the object. Developed concurrent is a reference beam of radiation time-coherent with the light. The reference beam is deflected throughout a scanning pattern, and a photodetector responds jointly to the reference beam and the signal field to develop electrical signals that represent the object characteristic. In order to view a cross-section of the signal field at a preselected distance from the active surface of the photodetector, the apparatus further includes an optical system that brings the reference beam to a focus at an effective distance from the photodetector surface corresponding to the pre-selected distance from the photodetector surface to the cross-section to be viewed.

The features of the invention which are believed to be novel are set forth with particularity in the appended claims. The invention, together with further objects and advantages thereof, may best be understood, however, by reference to the following description taken in conjunction with the accompanying drawings, in the several figures of which like reference numerals identify like elements, and in which:

Figure 1:
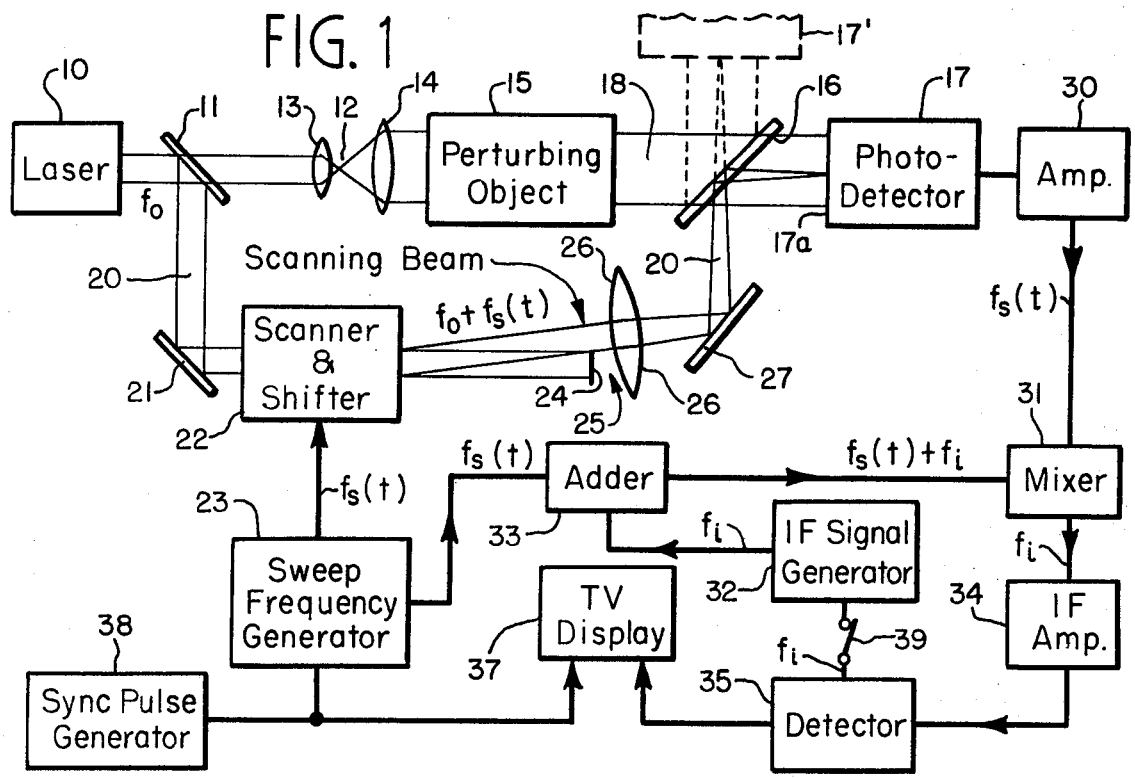
FIG. 1 is a combined schematic and block diagram of one embodiment of the present invention.

In FIG. 1, a portion of the light from a laser 10 is projected through a partially-silvered mirror 11 to a telescope 12 having an eyepiece 13 and an objective lens 14. Telescope 12 acts on the typically narrow beam of light from laser 10 to substantially expand its diameter so that it floods an object 15 which is to be studied, analyzed or reproduced. As illustrated, the flooding light is transmitted through object 15 after which it passes through another partially-silvered mirror 16 to the active surface 17a of a photodetector or photo-diode 17. While object 15 may be anything capable of in some way perturbing or otherwise altering the light passing through it, the simplest example is when object 15 is a transparency having characteristic areas of relative different attenuation to the light so as to define an image. Thus, the light quantity 18 emerging from the transparency is an optical signal field that has been perturbed in accordance with the variations in brightness which characterize the image carried on the transparency.

Another portion of the light from laser 10 is reflected downwardly by mirror 11 to form a reference beam 20. Beam 20 is directed by a mirror 21 into a scanner and frequency shifter 22. That is, beam 20 is deflected horizontally and vertically to define a scanning pattern in the form of a succession of horizontal lines spaced apart in the vertical direction like the scanning of an electron beam in a cathode-ray tube to define a television-type image raster. While light beam deflection may be achieved by the use of mirrors moved under the control of galvanometer-like elements, the system preferably employs an acoustic Bragg deflector arrangement of the kind described in an article entitled "A Television Display Using Acoustic Deflection and Modulation of Coherent Light" by Korpel et al., in the Oct., 1966 joint issue of I.E.E.E. PROCEEDINGS, Volume 54, and in APPLIED OPTICS, Volume 5.

As is now well understood, a Bragg deflector propagates acoustic waves of repetitively varying frequency across the light path. The acoustic waves diffract the beam of light at an angle which is proportional to the acoustic frequency so that, as the acoustic frequency varies, the light beam is caused to be deflected or scanned and thus to trace out a line. By using two such acoustic deflectors in series, deflection may be accomplished in coordinate directions so as to cause beam 20 to trace out a complete raster. As is also now well understood, the diffraction process used to deflect beam 20 also effects a shift in the frequency of the light emerging from the scanning mechanism. While the acoustic frequency supplied to scanner and shifter 22 is a complicated function of time in that it varies linearly for both the horizontal and vertical deflection angles imparted to beam 20, it may be represented for present purposes by the expression $f_s(t)$ as indicated in FIG. 1 for the signal derived from a sweep frequency generator 23. Representing the light in beam 20 emerging from laser 10 as having a frequency $f_o$, the deflected light leaving scanner and shifter 22 has an instantaneous frequency $f_o+f_s(t)$.

Beyond scanner-shifter 22, reference beam 20 next traverses an optical system 25, in this case simply in the form of a convergent lens 26. After lens 26, beam 20 is reflected by a mirror 27 onto mirror 16 which in turn reflects a portion of beam 20 onto the active surface of photodetector 17. A portion of the light from the diffraction-type scanner, known as the zero order, is not deflected. As shown, that portion is blocked by a stop 24.

In the photodetector, the light of signal field 18 beats against or is mixed with the light or radiation in reference beam 20. Consequently, the photodetector develops electric signals of the frequency $f_s(t)$ that include modulation components representative of the image characteristics on the transparency. That is, whatever characteristics of object 15 perturb signal field 18 are represented in the electric signals. In FIG. 1, lens 26 has been selected to focus the scanned reference beam 20 in a plane which coincides with the active surface 17a of photodetector 17. As a result, the cross-section of signal field 18 which is analyzed or viewed by photodetector 17 is that which is also in the plane of its active surface. Therefore, the electric signals it develops instantaneously represent the optical signal in field 18 averaged over the area of the spot formed on the active surface of the photodetector by reference beam 20. Since that spot is caused to be deflected repetitively through a scanning pattern, the photodetector output signals are somewhat analogous to the video signals produced by an ordinary vidicon camera. That is, the electric signal at any instant of time corresponds to the optical field characteristic at a particular time-determined position on the scanned raster. It may be noted that, for maximum output of the electric signals from photodetector 17, the phase front of reference beam 20 must be tangential to the phase front of signal field 18.

Being a video-type signal, the output information from photodetector 17 may either be stored or recorded for subsequent use or employed in real time to drive a television-type display device. The latter embodiment is shown in FIG. 1. For this purpose, the electric signals from photodetector 17 are first amplified in an amplifier 30 and then fed to one input of a mixer 31 the function of which is to convert the electric signals to a fixed intermediate frequency $f_i$. To that end, the system further includes an IF signal generator 32 which develops a signal of frequency $f_i$ that is summed in an adder 33 with the sweep signal of frequency $f_s(t)$ derived from generator 23. The resultant output signal, of frequency $f_s(t)+f_i$, from adder 33 is then fed to a second input of mixer 31 so that the modulation components on the electric signals from photodetector 17 now appear as modulation components on the intermediate-frequency signal at the output of mixer 31. That modulated intermediate-frequency signal is then fed through an intermediate-frequency frequency amplifier 34 to a detector 35 demodualtes the modulation components and thus converts them into actual video signals. These video signals are then employed in the conventional manner as image-forming signals in a television display receiver 37. Its image raster is synchronized with the scanning pattern of reference beam 20 by means of a synchronizing pulse generator 38 that governs the sweep frequency rates in both display receiver 37 and sweep frequency generator 23.

When detector 35 is a conventional video detector, that is, demodulates only the amplitude of the information content carried on the intermediate-frequency signal, display 37 develops a picture of the brightness variations present throughout the scanning pattern in the cross-section of optical field 18 at which reference beam 20 is focused. By instead detecting phase as well as amplitude variations in the modulation, the changes in the phase throughout the displayed cross-section of optical field 18 are reproduced in addition to the variations in amplitude. Those phase changes are recreated on display 37 as an overlying pattern of fringes. That is, display 37 produces a real-time hologram of the cross-section of signal field 18 at the focus reference beam 20. For this purpose, detector 35 is a synchronous detector which, in addition to receiving the modulated intermediate-frequency signal from amplifier 34, also is supplied the intermediate-frequency carrier as a reference from generator 32 through a switch 39 which is closed during that mode of detection.

The actual location of photodetector surface 17a need not coincide with the focus of reference beam 20. That location is quite immaterial so long as the photodetector receives all of the light in both reference beam 20 and signal field 18. The active surface may, for example, be either to the left or the right of the focal point of beam 20 as shown in FIG. 1. This arises because, in the absence of highly dispersive elements in the light path, photodetector 17 responds to the instantaneous power flow in the light and that power flow is independent of position. While the total instantaneous power flow is independent of the position of the photo-detector, the location of photodetector 17 can affect relative phase. That is, a change in the location of photodetector 17 as indicated by the dashed rectangle 17' results in the development of electric signals that are the inverse of those developed with the photodetector located as shown in full line. This arises because of the interference effects at mirror 16 which is half-silvered, that is, which passes half of the light incident thereon and reflects the other half.

Moreover, because photodetector 17 (or 17') responds to the instantaneous power flow in the combined light quantities, different cross-sections of signal field 18 may be displayed (or stored) merely by modifying optical system 25 and without photodetector 17. For example, removing lens 26 results in the scanned reference beam 20 having a focus at infinity. The display on receiver 37 then is that of the far field of coherent signal field 18. Furthermore, replacing convergent lens 25 with a divergent or negative lens causes the scanned reference beam to diverge from a virtual focus. This still results in a display of the cross-section of signal field 18 in a plane which is defined by the focus of scanned reference beam 20; when the focus of reference beam 20 is virtual, the selected plane of the signal field also may be said to be virtual rather than real. Stated another way, photodetector 17 effectively views a cross-section of signal field 18 that is located a distance from photodetector surface 17a which is the same as is the distance of the focus of reference beam 20 from surface 17a, and this is the case regardless of whether that latter focus is real or virtual. As drawn in FIG. 1, the cross-section viewed is the near field at zero distance from the photodetector surface, since reference beam 20 is represented as being focused right at the photodetector surface. By instead focusing reference beam 20 at a distance from photodetector surface 17a equal to the distance that the assumed transparency constituting object 15 is located from that surface, the reproduced image or hologram is that of the optical signal field in the plane of the transparency itself.

This capability of being able, in effect, to cause photodetector 17 to "view" any desired cross-section of signal field 18, merely by simple adjustment of an optical element, finds particularly advantageous utilization in observing a dynamically scattered laser beam reflected from an acoustically perturbed surface. One previously disclosed approach for reproducing acoustic holograms with the use of a scanning laser beam is described in an article entitled "Rapid Sampling of Acoustic Holograms by Laser-Scanning Techniques" by Korpel et al., which appeared in the JOURNAL OF THE ACOUSTICAL SOCIETY OF AMERICA, Volume 45, No. 4, Apr., 881–884, Apr., 1969, which technique also is the subject of copending application Ser. No. 763,676, filed Sept. 30, 1968 by Adrianus Korpel and assigned to the same assignee as the present application. That method and apparatus translates the acoustic field of an irradiated subject to a composite ripple pattern of surface-wave-perturbations on a solid surface which is then scanned with a flying spot laser scanner. That is, the perturbed surface is scanned with a focused beam of coherent light, and light reflected from the surface is partially intercepted by a knife-edge or the equivalent and fed to a photodetector. The signal from the photodetector is applied to a television monitor which results in a stationary display of the original composite ripple pattern on the observed surface which constitutes an acoustic hologram. A photograph taken of the television screen then constitutes a permanent holographic recording that may be reconstructed in a conventional way, that is, by illumination with an appropriate reference beam. Alternatively, the processing of the signals is such as to produce a conventional picture of the sound field of the surface. The present system differs in that real-time holograms are obtained and the cross-section under observation may be selected as desired.

Figure 2:
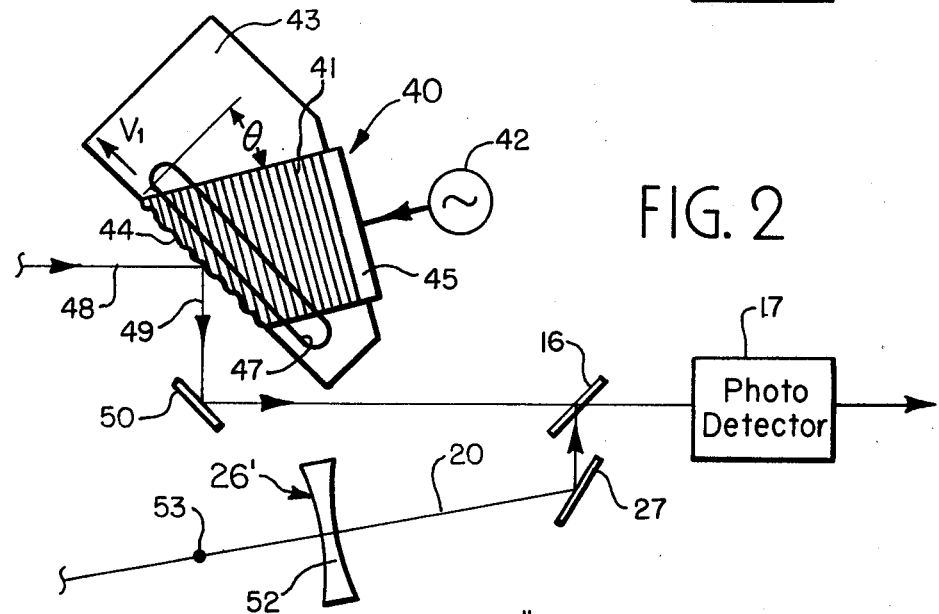
FIG. 2 is a diagram of a modification of a portion of the system shown in FIG. 1.

Utilizing the present system, surface wave perturbations, in themselves produced in the same manner, are flooded with light from laser 10 like object 15 is flooded to develop signal field 18. Turning, then, to FIG. 2, a transducer 40 generates acoustic waves represented by wavefronts 41 at a frequency $f_m$ determined by that of an applied electrical signal from a signal generator 42. While the acoustic wave frequency is not critical, suitable results for many applications may be obtained by employing an acoustic signal frequency in the range from 1 to 10 Megahertz. Transducer 43 is composed of a block of suitable solid material, such as methyl methacrylate (e.g., "Lucite" supplied by E. I. DuPont de Nemours, Inc.), polystyrene or other plastic material provided with a surface 44 which is rendered highly reflective by the provision of a surface film of polished gold or the like.

Acoustically coupled to block 43 is a piezoelectric transducer 45 responsive to electrical signals from generator 42 to propagate the acoustic waves toward reflective surface 44 in a direction forming an acute angle $\theta$ with respect to normal incidence. Wavefronts 41 are thus inclined at angle $\theta$ with respect to surface 44. Accordingly, the sound waves strike surface 44 at the angle $\theta$, thereby causing a displacement component to run upwards across surface 44 with a velocity $v_t$ which is equal to $v_b/\sin\theta$, where $v_b$ is the bulk sound velocity inside block 43. Sound wave reflections are eliminated or reduced to negligible amplitude by roughening the remaining surfaces of block 43 or lining them with sound absorbing material. Alternatively, block 43 may be so dimensioned that the reflected wave is sufficiently attenuated by inherent absorption in the material.

A cavity or slot 47 is machined into block 43 and filled with a liquid acoustic-wave transmission medium. The size and shape of cavity 47 are not critical and, if desired, the construction may consist simply of a relatively thin-walled tank filled with water or other suitable liquid; in any apparatus designed specifically for use with a particular type of object specimen, cavity 47 preferably is formed to orient the specimen at the desired angle $\theta$ to the acoustic wavefronts. In a preferred embodiment, block 43 is made of a methyl methacrylate plastic and slot 47 is filled with water. When greater sensitivity is required, acoustic impedance matching may be provided by selection of materials and the interposition of impedance matching layers at the interfaces between the liquid and solid media.

The object to be visualized is placed inside the cavity where it scatters the incident sound beam. Each plane wave in the angular spectrum of the scattered sound field causes its own characteristic ripple pattern on the front surface 44 of the block. If the composite ripple pattern were recorded optically, by stroboscopic Schlieren techniques, it would constitute a hologram of the sound field recorded with a fictitious reference beam incident normal to surface 44. The attainable contrast, however, would be critically dependent on the optical quality of the surface and has been found to be generally insufficient to permit direct photographic recording.

In the present system, surface 44 is flooded with a broad field of light 48 which, in turn, reflects from surface 44 as an optical signal field 49 to a mirror 50. Mirror 50 redirects signal field 49 through partially transparent mirror 16 to photodetector 17. At the same time, reference beam 20 from scanner and shifter 22 traverses optical system 26', is redirected by mirror 27 and is in part reflected into photodetector 17 by partial-mirror 16. In operation, signal field 49 is perturbed by the acoustic waves on surface 44. As already indicated, those acoustic waves, or their composite ripple pattern, constitute an acoustic hologram. By suitably adjusting optical system 26' so that the cross-section viewed is at surface 44, that acoustic hologram is reproduced on display 37 in real time. To that end, a negative lens 52 is interposed in the path of reference beam 20 so that the latter has a virtual focus 53 spaced the same distance along the path of beam 20 from photodetector surface 17a as surface 44 is spaced along the path of signal field 49 from the photodetector surface. If, instead of operating detector 35 synchronously as a phase detector, it detects only amplitude, display 37 produces a conventional image of surface 44.

Figure 3:
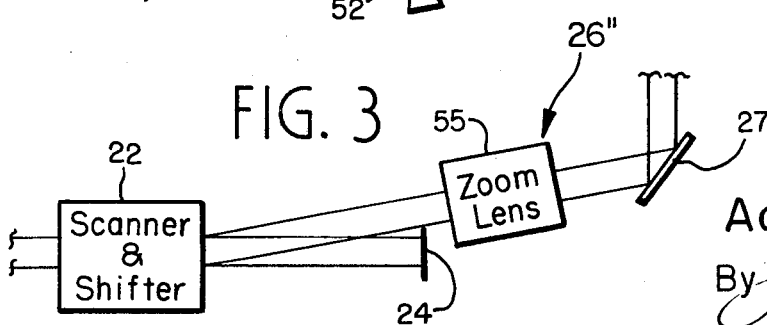
FIG. 3 is a diagram of a modification of a portion of the apparatus shown in either FIGS. 1 or 2.

When, on the other hand, it is desired to look at the far field of the signal information so as, in effect, to obtain information from behind surface 44, optical system 26 is adjusted to move focus 53 still farther from photodetector 17. Illustrating an increased degree of flexibility so as to permit selection of the viewed cross-section at any location within the signal field, optical system 26'' desirably takes the form of a conventional zoom lens 55 as shown in FIG. 3.

The light of incoming signal field 48, in being reflected into signal field 49, is diffracted by the acoustic ripple pattern on surface 44. The ripple pattern constitutes an acoustic perturbation of frequency $f_m$. This perturbation of signal field 49 causes its light to be Doppler-shifted in frequency from the original frequency $f_o$ and from statically scattered light by the frequencies $\pm nf_m$, where $n$ is an integer. Accordingly, the signal from the output of mixer 31 may be represented as including, in addition to higher order modulation components corresponding to higher integers of n, $f_i+f_m$ and $f_i-f_m$. By constructing intermediate-frequency amplifier 34 to have a narrow passband transmissive of only the desired diffraction-field component (as in a single-sideband communications receiver wherein the amplification stages include filtering selective of only a desired sideband), the component of primary interest is permitted to be detected without interference from the other components or from scattered ambient light or noise which often is of a substantially higher intensity than is the desired component.

In a prototype system, both the flood beam and the reference beam were derived from a helium-neon laser. Signal field power $P_s$ and local oscillator beam power $P_o$ were 0.15 milliwatts. In that case, the cross-section of both the flood and reference beams was a 2centimeter square. The scanning frequency, $f_s(t)$ varied from 40 Megahertz to 70 Megahertz, and the intermediate frequency was either 14 Megahertz or 22.5 Megahertz, depending upon the particular investigation being conducted. Intermediate-frequency amplifier 34 had a filter bandwidth of 6 Megahertz. The scanning pattern of reference beam 20, as well as that of display 37, was operated at the standard television scanning rates of 15,750 Hertz for the horizontal and 60 Hertz for the vertical.

It can be shown that the signal-to-noise ratio S/N of such a system is represented by the expression:

$$S/N = \frac{\dfrac{\alpha P_o P_s}{N}}{eB(P_o + P_s)\left(1 + \dfrac{N_t}{N_n}\right)} \qquad (1)$$

where $N$ is the number of resolvable spots of which the scanning system is capable, $\alpha$ is the sensitivity of the photodetector, $e$ is the electron charge, $B$ is the filtering bandwidth, $N_t$ is the thermal noise and $N_n$ is the shot noise. In many cases of practical interest, $P_o$ is much greater than $P_s$ as a result of which equation (1) becomes:

$$S/N = \frac{\alpha P_s/N}{eB(1 + N_t/N_n)} \quad (2)$$

Assuming that the system is shot-noise limited, the weakest detectable field (i.e., that field for which $S/N = 1$) is represented by the equation:

$$(P_s)\ \text{min} = \frac{eBN}{\alpha} \quad (3)$$

In an optimally designed scanning system,
$$B = N/2T \quad (4)$$
where $T$ is the scanning time for one picture. Sensitivity can be increased by using a slower scan rate, keeping the value of $N$ constant and reducing the bandwidth $B$. It can also be improved by lowering the number $N$ of resolvable spots; if scanning speed remains constant, this also permits a reduction of bandwidth $B$.

With experimental values in the prototype system involving a bandwidth of 6 Megahertz, a resolution $N$ of 10,000 and a photodetector sensitivity of 0.37 Amperes per watt, the theoretical minimum sensitivity given be equation (3) was $0.26 \times 10^{-7}$ watts. Test results in observing a signal field perturbed by an 85 line-per-inch Ronchi ruling afforded a visual signal-to-noise ratio near unity when the signal power $P_s$ was lowered to $1.5 \times 10^{-7}$ watts. The experimental difference arose because the photo-diode employed as photodetector 17 was not shot-noise limited.

Systems have thus been disclosed which find particularly advantageous use in the filed of real-time acoustic holography and imaging. In that utilization, the instantaneous surface displacement forms a hologram of the acoustic field (with the effective, although non-existent, acoustic reference beam being normal to the surface). A particular cross-section, belonging to some selected order of the signal-field light diffracted by the acoustic displacement, then becomes the reconstructed image of the acoustic field in a corresponding cross-section. By changing the optics, any desired cross-section of the optical signal field, and hence of the acoustic field, may be displayed in real time on a television screen or recorded for alter reproduction.

If, instead of an image of one particular acoustic cross-section, a hologram of the acoustic field is desired (as for example to be recorded for a later visualization of any acoustic cross-section), both the phase and amplitude of the light reflected into the selected order by the acoustic surface displacement are displayed and photographed. In this mode of operation, the system is employed as a means to produce an optical hologram by sampling, an optical holographic technique corresponding to techniques previously known in acoustic holography only.

While particular embodiments of the present invention have been shown and described, it is apparent that changes and modifications may be made therein without departing from the invention in its broader aspects. The aim of the appended claims, therefore, is to cover all such changes and modifications as fall within the true spirit and scope of the invention.

I claim:

1. Apparatus for analyzing an object comprising:
   means for flooding said object to produce a coherent-light signal field perturbed by a characteristic of the object;
   means for developing a reference beam of radiation time coherent with said light;
   means for deflecting said reference beam throughout a scanning pattern;
   a photodetector having a surface responsive jointly to said reference beam and said signal field for developing electric signals representative of said characteristic;
   and means for viewing a cross-section of said signal field at a pre-selected distance from said photodetector surface including an optical system for bringing said reference beam to a focus at an effective distance from said photodetector surface corresponding to said pre-selected distance.

2. Apparatus as defined in claim 1 which further includes a display device for developing an image raster synchronously related to said scanning pattern and responsive to said electric signal for creating on said raster a picture of said signal field at said cross-section.

3. Apparatus as defined in claim 1 which further includes a video detector for demodulating the amplitude of said electric signals.

4. Apparatus as defined in claim 1 which further includes a phase detector for demodulating the phase of said electrical signal.

5. Apparatus as defined in claim 1 in which the frequency of said radiation in said reference beam differs by a predetermined amount from the frequency of said light in said signal field and which further includes means for mixing said electric signals with a reference signal having a frequency differing by said predetermined amount from an intermediate frequency and means for amplifying said intermediate frequency.

6. Apparatus as defined in claim 1 in which the perturbation of said signal field creates in said electric signal a plurality of modulation components individually at respective different frequencies and which further includes filter means responsive to said electric signals for selecting a particular one of said modulation components.

7. Apparatus as defined in claim 1 in which said photodetector is disposed to intercept all of the light and radiation present in both said signal field and said reference beam.

8. Apparatus as defined in claim 1 in which, upon arrival at said photodetector surface, the phase front of said radiation in said reference beam are tangential with the phase front of said light in said signal field.

9. Apparatus as defined in claim 1 in which said optical system is adjustable to vary the effective distance from said photodetector surface to said focus.

10. Apparatus as defined in claim 1 in which said object surface effectively represents an acoustic hologram and said electric signals include components representative of said acoustic hologram.

11. Apparatus for producing a signal representative of image information in selected planes of a coherent-light-signal field spatially modulated by an object, comprising:
    a photodetector having a surface responding to light amplitude variations to develop an electrical signal;
    means for illuminating a predetermined area of said photodetector surface with a flood beam of coherent light spatially modulated with said image information, said modulated flood beam constituting said signal field;
    means for developing a reference beam of radiation time-coherent with said light and of constant intensity;
    means for scanning said reference beam over said predetermined area of said photodetector surface;
    and means for viewing a cross-section of said modulated flood beam at a preselected distance from said modulating object including an optical system for bringing said reference beam to a focus at an effective distance from said object corresponding to said preselected distance so that said signal from said photodetector varies in a manner representative of said image information over said cross-section.

* * * * *